Aug. 2, 1949. A. E. LABSER 2,477,933
COLLISION MAT FOR VEHICLES
Filed April 11, 1947 4 Sheets-Sheet 3
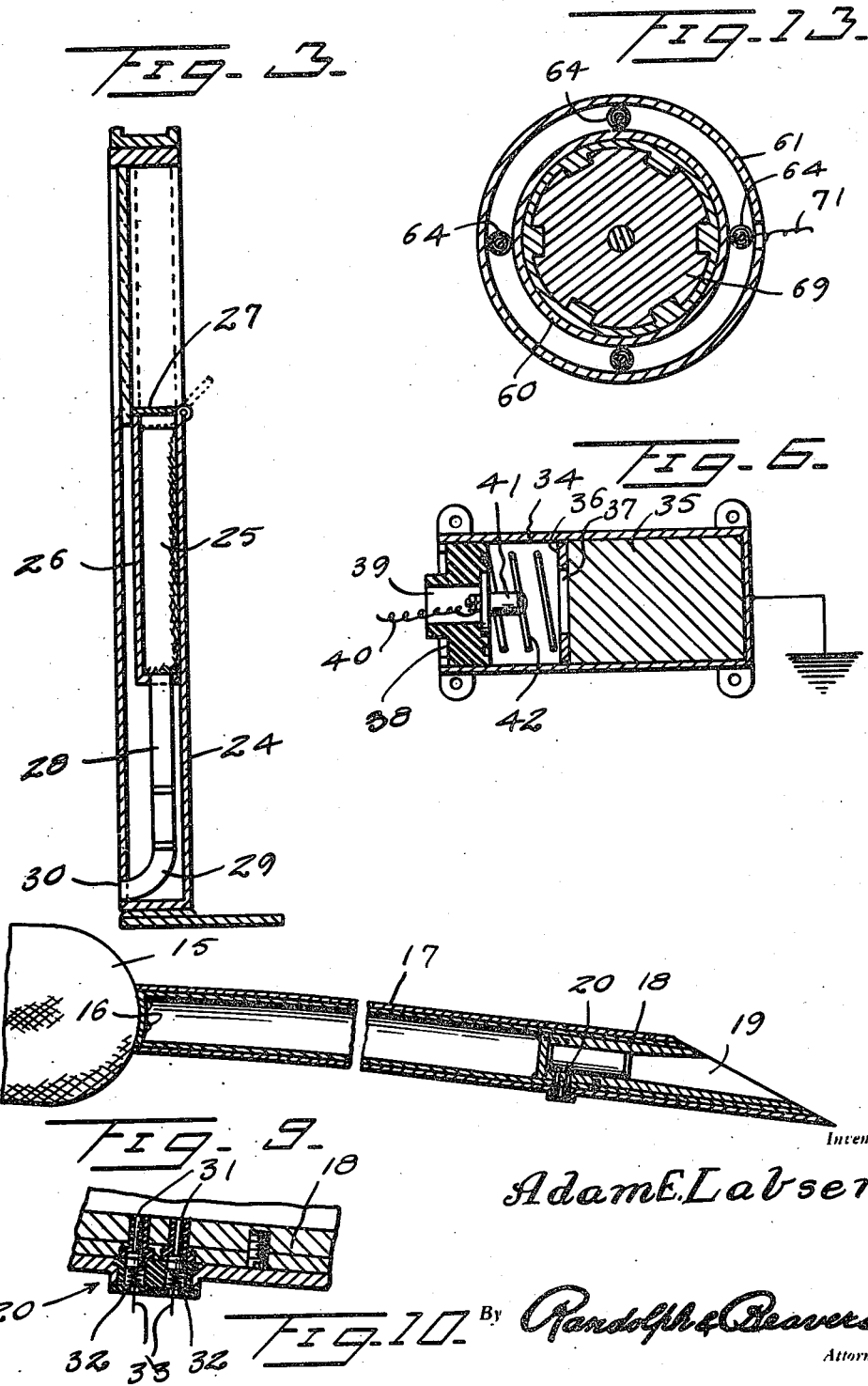
Inventor
Adam E. Labser
By Randolph & Beavers
Attorneys

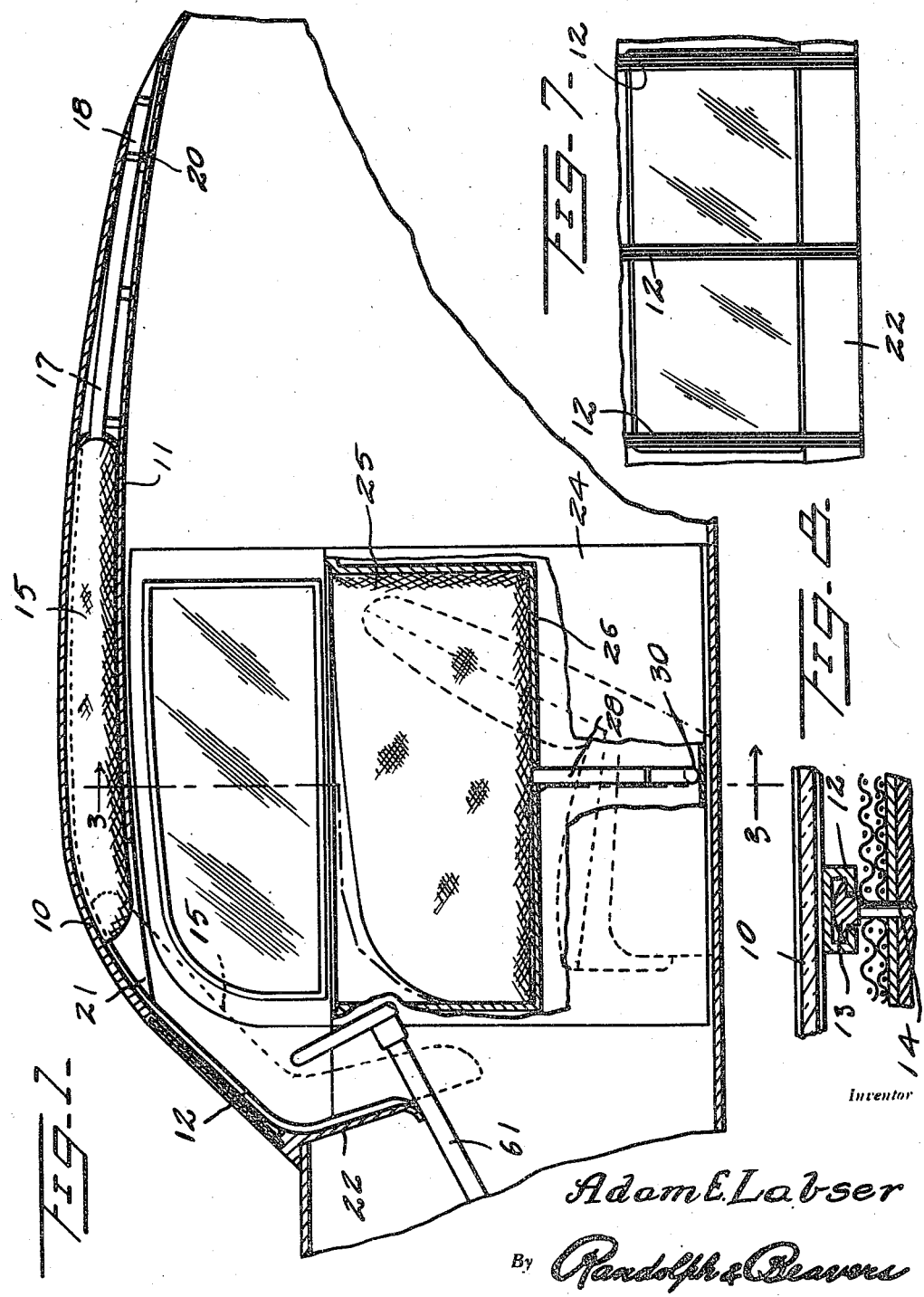

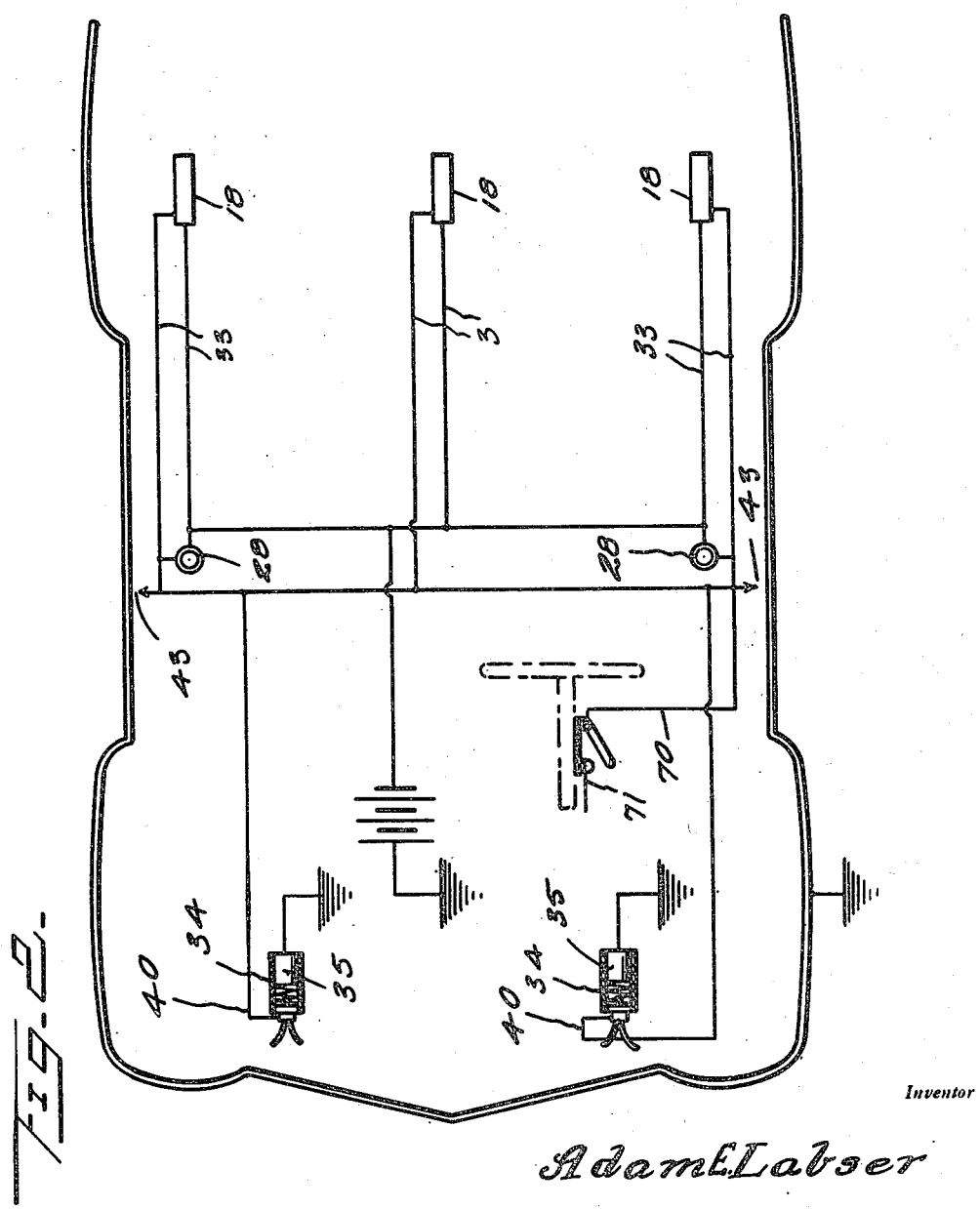

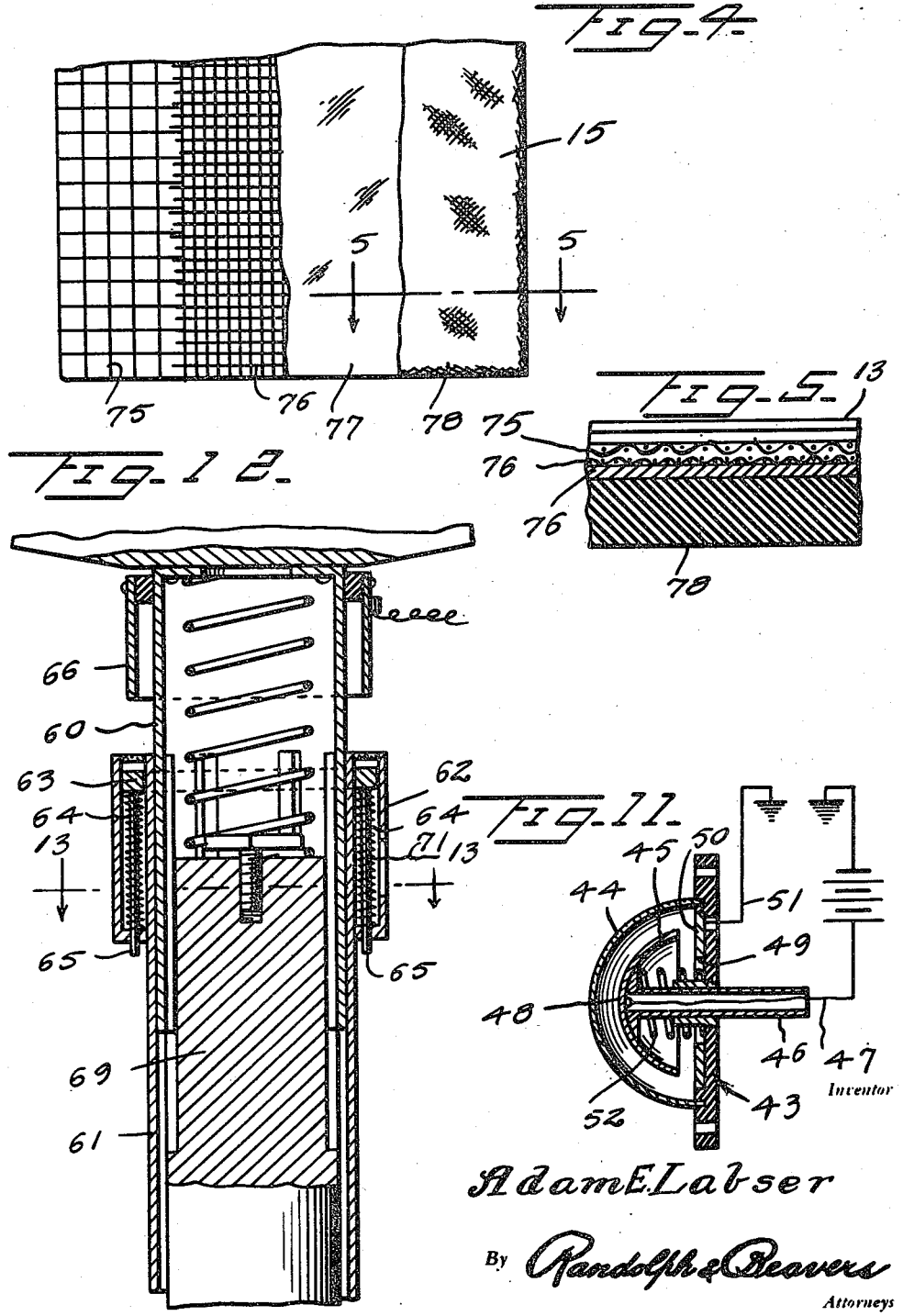

Patented Aug. 2, 1949

2,477,933

UNITED STATES PATENT OFFICE 2,477,933

COLLISION MAT FOR VEHICLES

Adam E. Labser, Hamden, N. Y.

Application April 11, 1947, Serial No. 740,746

1 Claim. (Cl. 296—84)

The present invention relates to collision mats for vehicles and it consists in the combinations, constructions and arrangements of parts herein described and claimed.

Generally, the invention comprises a plurality of collision pads or mats which are mounted in convenient storage locations within the body and top of a vehicle and which are adapted to be propelled by rockets into positions at the front and forward sides of the vehicle automatically upon a collision with such vehicle. For actuating the rockets a plurality of inertia operated switches are provided at convenient locations upon the vehicle and these switches are electrically connected with the rockets. The steering column of the vehicle is likewise provided with such a switch.

It is an object of the invention to provide a novel means and mechanism whereby collision pads may be automatically placed over the windshield and side windows of a vehicle whenever a collision takes place.

A further object of the invention is the provision of novel switching means for actuating a device as above described.

Another object of the invention is the provision of a novel construction in a steering column whereby a switch is closed in the event of a sudden forward pressure upon the steering wheel.

A further object of the invention is the provision of novel means and mechanism for the prevention of cuts from flying glass in the event of a collision.

Other and further objects of the invention will become apparent from a reading of the following specification taken in conjunction with the drawings, in which:

Figure 1 is a sectional elevational view of a portion of a vehicle including an embodiment of the invention, Figure 2 is a schematic view illustrating an electrical system forming part of the invention, Figure 3 is a sectional view taken along line 3—3 of Figure 1, Figure 4 is a fragmentary plan view of a collision mat forming a part of the invention and having certain portions removed to expose the construction thereof, Figure 5 is an enlarged sectional view taken along line 5—5 of Figure 4, Figure 6 is a sectional view of a switch forming a part of the present invention, Figure 7 is a fragmentary elevational view illustrating certain details of the invention, Figure 8 is a fragmentary sectional view illustrating the method of mounting the pads forming part of the invention, Figures 9 and 10 are fragmentary sectional views illustrating details of the invention, Figure 11 is a sectional view of a switch forming a part of the invention, Figure 12 is a sectional view of a steering column switch forming a part of the invention, and Figure 13 is a sectional view taken along line 13—13 of Figure 12.

Referring more particularly to the drawings, there is shown therein a motor vehicle having a roof 10 beneath which is provided a compartment formed by the roof and a partition 11. Within the compartment there is provided a plurality of rails 12 having inturned lower edges whereby the heads 13 of studs 14 may be mounted therein. The studs 14 are securely fastened to the collision pads 15 which are stored in the compartment. Fastened to the rear end of the collision pad 15, as indicated at 16 are a series of flexible tubes 17 having rocket firing compartments 18 at their rear ends. The open ends 19 of the rocket compartments protrude slightly through the roof 10 of the vehicle and a firing device 20 is provided at the rear of the compartment.

An opening 21 is provided at the forward end of the partition 11 and the rails 12 extend downwardly to a point below the windshield on the dashboard 22 of the vehicle.

In each of the forward doors 24 of the vehicle there is provided a collision pad 25 which is stored in a separate compartment 26 having a hinged cover 27 at its upper end. A rocket tube 28 is centrally mounted below the compartment 26 and has its lower end curved outwardly as indicated at 29 to communicate with an opening 30 in the lower outer side of each door.

The firing device 20 consists of a pair of electrodes 31 spring pressed inwardly by means of springs 32 and the electrodes are connected by suitable wiring 33 to a source of power and various switches hereinafter to be described.

One form of switch utilized in the invention is clearly disclosed in Figure 6 wherein there is provided a cylindrical body 34 within one end of which is provided a heavy weight 35 which generally conforms to the inner sides of the cylinder 34. Abutting the weight 35 is a washer 36 having a centrally disposed opening 37 therein. The other end of the cylindrical body 34 is provided with an annular member of dielectric material 38 having an opening 39 centrally disposed therein for the reception of a wire 40 which connects with a contact member 41 carried by the inner side of the member 38. A spring 42 is interposed between the member 38 and the washer 36.

Mounted preferably upon the chassis of the vehicle, in order to be actuated by shocks received against the sides of the vehicle, is a switch 43 which is provided with a flexible cover 44 of semi-spherical shape under which is a metallic member 45 of like shape which is provided with an inwardly extending tubular portion 46 through which is a wire 47 adapted to pass and contact the member 45 as indicated at 48. A base 49 of dielectric material is provided for the switch within which a ring 50 of metal is provided which ring is connected by means of a wire 51 to the ground. A spring 52 is interposed between the under side of the member 45 and the base 49.

The steering column of the vehicle is provided with an extension 60 which is slidably mounted within the steering column proper 61 which carries at its upper end an annular housing 62 having a ring 63 of conductive material mounted therein and which ring is adapted to be urged upwardly by means of springs 64 mounted within the housing 62 upon pins 65. The movable or extended portion 60 of the steering column carries a dependent annular contact member 66 and has a spring 67 interposed between its upper inturned edge 68 and a solid inner extension 69 of the steering column. The contact member 66 and the ring 63 are respectively connected to wiring 70 and 71.

The collision mats 15 are preferably formed of several layers of material. For example, the inner layer 75 is formed of rubber and the next several layers 76, 77 and 78 may be formed of flexible materials of various kinds. It will be understood that the mats 15 may be inflated in any suitable manner.

In operation, it will be apparent that upon a collision between the vehicle carrying the apparatus above described and any other object that the switches such as illustrated in Figure 6 will be actuated through the inertia of the weight 35 which will move against the action of the spring 42 to make contact with the contact member 41 thereby completing a circuit to the firing device 20. Again, upon such a collision taking place the weight of the driver would be impressed upon the steering wheel causing the contact members 66 and 63 to come together against the action of the spring 67 which tends to normally hold the same apart. This also will cause a closing of an electrical circuit to the firing device 20. Again, in the form of switch disclosed in Figure 11, any impact against the flexible cover 44 will bend the same inwardly and depress the member 45 against the action of the spring 52 and into contact with the ring 50 thereby closing a circuit to the firing mechanisms.

Upon the closing of any one of the circuits above mentioned the firing mechanism will cause the firing of the rockets contained in the tubes 18 and in the tubes 28 thereby causing first the pad 15 to travel forwardly along the rails 12 to a position along the inner side of the windshield and secondly will cause the pads 25 to move upwardly automatically opening the doors 27 and covering the inner sides of the glass windows of the doors adjacent the forward end of the car. Thus it will be seen that immediately upon the occurrence of a collision and before any possibility of glass being shattered, there will be forced into complete coverage at the forward end of the vehicle against flying glass and also provision is made for lessening the shock should the body of the passengers of such vehicle be hurled forwardly.

While but one form of the invention has been shown and described herein, it will be readily apparent to those skilled in the art that many minor modifications may be made without departing from the spirit of the invention or the scope of the appended claim.

What is claimed is:

In a vehicle including a body having a top, a windshield, and an instrument board under the windshield; a partition spaced downwardly from the top and providing a chamber extending longitudinally of its body and having an open front end portion curved downwardly and terminating above the windshield, slotted tubes in said chamber constituting tracks extending longitudinally therein in transverse spaced relation to each other with their forward portions extending downwardly along and beyond the windshield a collision mat in said chamber, studs carried by said mat and slidably engaged in said tracks and mounting the pad for movement through the front end of the chamber from a retracted position to an extended position in which it extends downwardly in covering relation to the windshield and the instrument board, a tube extending longitudinally in the rear portion of said chamber from said pad, a follower in the tube an explosive in the tube which acts against the follower and mat, when exploded to drive the mat forwardly and electrically energized means for firing the explosive including a circuit having switches at the sides and ends of the body adapted to be closed by jolts delivered to the body during a collision.

ADAM E. LABSER.

REFERENCES CITED

The following references are of record in the file of this patent:

UNITED STATES PATENTS

| Number | Name | Date |
|---|---|---|
| 1,019,858 | Tanner | Mar. 12, 1912 |
| 1,256,848 | Uttz | Feb. 19, 1918 |
| 1,624,418 | Marsh | Apr. 12, 1927 |
| 2,050,141 | Wethington | Aug. 4, 1936 |
| 2,180,912 | Rogers | Nov. 21, 1939 |
| 2,426,034 | Leonard | Aug. 19, 1947 |

FOREIGN PATENTS

| Number | Country | Date |
|---|---|---|
| 689,857 | France | June 3, 1930 |